US009399586B2

United States Patent
Cao

(10) Patent No.: US 9,399,586 B2
(45) Date of Patent: Jul. 26, 2016

(54) DEVICE FOR MAKING NANO-SCALE PARTICLES OF TITANIUM DIOXIDE AND METHOD OF MAKING NANO-SCALE PARTICLES OF TITANIUM DIOXIDE USING THE DEVICE

(71) Applicants: SHENZHEN FUTAIHONG PRECISION INDUSTRY CO., LTD., Shenzhen (CN); FIH (Hong Kong) Limited, Kowloon (HK)

(72) Inventor: Da-Hua Cao, Shenzhen (CN)

(73) Assignees: SHENZHEN FUTAIHONG PRECISION INDUSTRY CO., LTD., Shenzhen (CN); FIH (Hong Kong) Limited, Kowloon (HK)

( * ) Notice: Subject to any disclaimer, the term of this patent is extended or adjusted under 35 U.S.C. 154(b) by 721 days.

(21) Appl. No.: 13/720,095

(22) Filed: Dec. 19, 2012

(65) Prior Publication Data
US 2013/0343984 A1    Dec. 26, 2013

(30) Foreign Application Priority Data

Jun. 21, 2012   (CN) .......................... 2012 1 0207221

(51) Int. Cl.
| B01J 12/02 | (2006.01) |
| B01J 3/00 | (2006.01) |
| C01G 23/07 | (2006.01) |
| B82Y 40/00 | (2011.01) |

(52) U.S. Cl.
CPC ............... *C01G 23/075* (2013.01); *B01J 3/006* (2013.01); *B01J 12/02* (2013.01); *C01G 23/07* (2013.01); *B82Y 40/00* (2013.01); *Y10S 977/896* (2013.01)

(58) Field of Classification Search
CPC ........ C01G 23/07; C01G 23/075; C01G 1/02; B01J 3/002; B01J 3/006; B01J 3/03; B01J 12/02
See application file for complete search history.

(56) References Cited

U.S. PATENT DOCUMENTS

| 2,018,265 | A | * | 10/1935 | Kemmer | ................. C22B 26/22 75/595 |
| 4,488,904 | A | * | 12/1984 | Miura | ..................... B01D 7/00 75/599 |
| 4,521,244 | A | * | 6/1985 | Goursat | .................... B22F 9/12 252/1 |
| 4,533,382 | A | * | 8/1985 | Miura | ....................... B22F 9/12 266/200 |
| 2003/0115986 | A1 | | 6/2003 | Pozarnsky et al. | |
| 2005/0179175 | A1 | * | 8/2005 | Johnson | .................... B22F 9/12 266/171 |
| 2009/0151512 | A1 | * | 6/2009 | Nakatani | .................. B22F 9/12 75/351 |

FOREIGN PATENT DOCUMENTS

GB            552120 A  *  3/1943  ............... B22F 9/28

\* cited by examiner

*Primary Examiner* — Jennifer A Leung
(74) *Attorney, Agent, or Firm* — ScienBiziP, P.C.

(57) ABSTRACT

A device for making nano-scale particles of titanium dioxide includes a vacuum chamber; an evaporator, a gas supplier, a vacuum pump assembly, and a product collecting device. The evaporator is mounted in the vacuum chamber. The gas supplier communicates with the vacuum chamber. The vacuum pump assembly communicates with the vacuum chamber. The product collecting device includes a pump, a guide pipe connected with the pump, and a powder collector communicating with the guide pipe. The pump communicates with the vacuum chamber. The guide pipe is inserted in the powder collector, the powder collector is filled with organic solvents. A method of making nano-scale particles of titanium dioxide using the device is also provided.

12 Claims, 1 Drawing Sheet

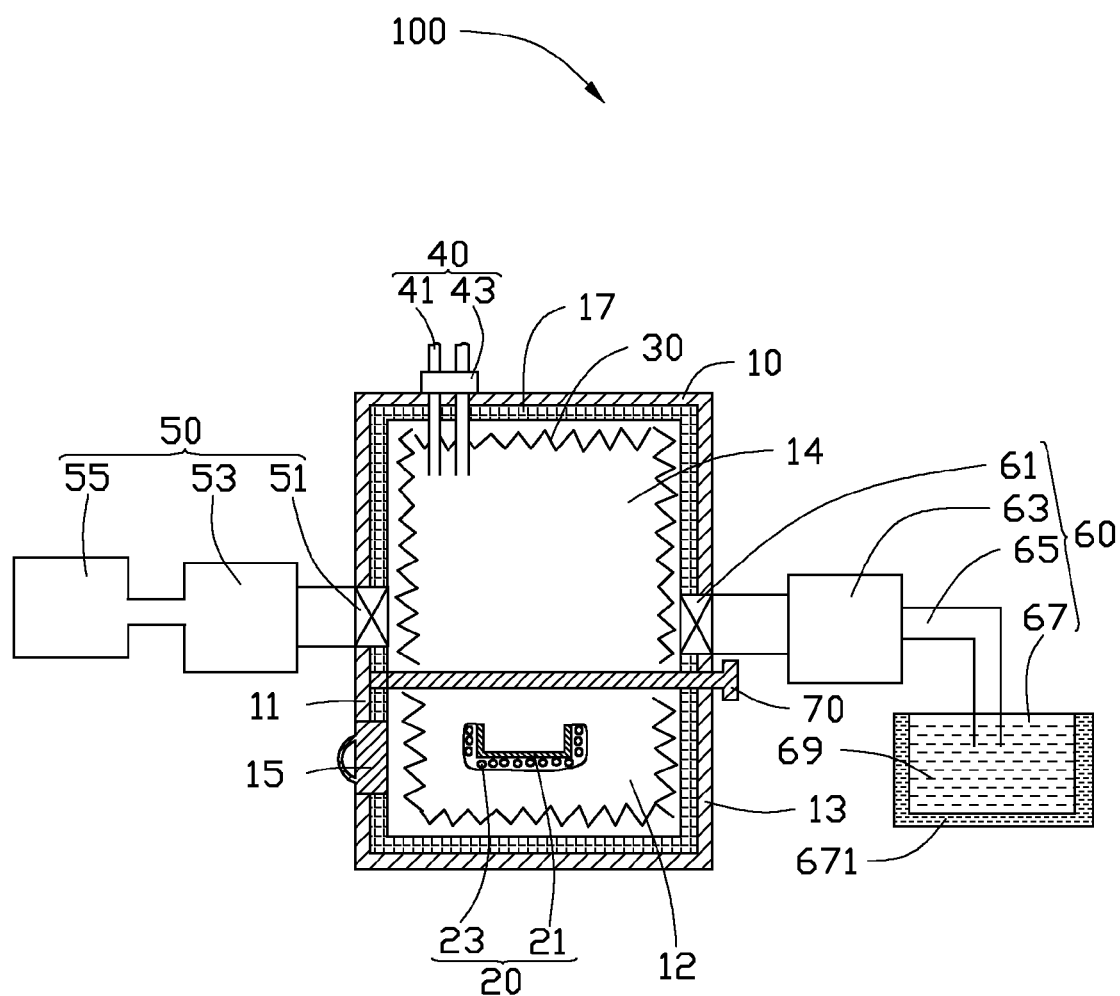

DEVICE FOR MAKING NANO-SCALE PARTICLES OF TITANIUM DIOXIDE AND METHOD OF MAKING NANO-SCALE PARTICLES OF TITANIUM DIOXIDE USING THE DEVICE

BACKGROUND

1. Technical Field

The present disclosure generally relates to a device for making nano-scale particles of titanium dioxide and a method of making nano-scale particles of titanium dioxide using the device.

2. Description of Related Art

Nano-scale particles of titanium dioxide have excellent anti-ultraviolet and self-cleaning properties, and ageing resistance. The common methods for synthesis of nano-scale particles of titanium dioxide are the hydrothermal process, chemical deposition process, and the sol-gel process. The sol-gel process commonly uses a titanate to produce the nano-scale particles of titanium dioxide, which is simple, environmentally friendly, and not costly. However, during the sol-gel process, the titanium dioxide particles are prone to agglomeration which badly affects the properties of the nano-scale particles of titanium dioxide.

Therefore, there is room for improvement within the art.

BRIEF DESCRIPTION OF THE DRAWINGS

Many aspects of the embodiment can be better understood with reference to the drawing. The components in the drawing are not necessarily drawn to scale, the emphasis instead being placed upon clearly illustrating the principles of the exemplary disclosure.

The FIGURE is a schematic view of an exemplary embodiment of a device for making nano-scale particles of titanium dioxide.

DETAILED DESCRIPTION

The FIGURE shows a device 100 for making titanium dioxide ($TiO_2$) into nano-scale particles (nano-titanium dioxide) according to an exemplary embodiment. The device 100 includes a vacuum chamber 10, an evaporator 20, a heater 30, a gas supplier 40, a vacuum pump assembly 50, and a product collecting device 60.

The evaporator 20 is mounted in the chamber 10 adjacent to the bottom wall of the chamber 10. The heater 30 is mounted in the chamber 10 and surrounds the inner peripheral wall of the chamber 10. The vacuum pump assembly 50 and the product collecting device 60 communicate with opposite sides of the chamber 10.

The chamber 10 includes a first sidewall 11 and an opposite second sidewall 13. The first sidewall 11 defines a vacuum gate 15 through which evaporation material is fed, to be synthesized into nano-titanium dioxide. The chamber 10 further includes a heat insulating board 17 covering the inner peripheral wall of the chamber 10. The board 17 is for preventing heat within the chamber 10 from dissipating, thus enhancing the heating rate of the heater 30. The board 17 also prevents evaporated nano-titanium dioxide from condensing on the inner peripheral wall of the chamber 10. The board 17 may be made of ceramic and asbestos materials with high temperature resistance.

The evaporator 20 includes a crucible 21, and a heating element 23 located around the crucible 21. The crucible 21 receives the evaporation material. The heating element 23 is for heating the crucible 21 to vaporize the evaporation material. In the embodiment, the heating element 23 is a high frequency induction heating device.

The heater 30 heats the chamber 10 to provide a desired temperature in the vacuum chamber 10. The heater 30 may be an electric heating wire, an electric heating tube, or an electric heating board.

The gas supplier 40 provides the chamber 10 with reaction gases or/and working gases. The gas supplier 40 includes at least one gas passage 41 and a flow meter 43. The gas passage 41 is connected with the chamber 10. The flow meter 43 is mounted on the gas passage 41 to monitor the flow rate of reaction gases or/and working gases fed into the chamber 10.

The vacuum pump assembly 50 is connected to the chamber 10 to evacuate the chamber 10. The vacuum pump assembly 50 includes a first vacuum valve 51, a vacuum pump 53 connected to the first vacuum valve 51, and a holding pump 55 connected with the vacuum pump 53. The first vacuum valve 51 is mounted to the first sidewall 11.

The product collecting device 60 is for collecting nano-scale particles (product) from the chamber 10. The product collecting device 60 includes a second vacuum valve 61, a mechanical pump 63 connected to the vacuum valve 61, a guide pipe 65 connected to the mechanical pump 63, and a powder collector 67 communicating with the guide pipe 65. The first vacuum valve 51 is mounted to the second sidewall 13.

The powder collector 67 is filled with organic solvents. The guide pipe 65 is inserted in the powder collector 67 to communicate with the powder collector 67. The powder collector 67 includes an interlayer 671 in which cooling water/solution flows. The cooling water/solution may be provided by a cooling device (not shown). The mechanical pump 63 extracts the vaporized titanium dioxide from the vacuum chamber 10 and transmits the vaporized titanium dioxide into the powder collector 67 by the guide pipe 65 to cool the vaporized titanium dioxide to form nano-titanium dioxide powder in the powder collector 67.

The device for making nano-titanium dioxide 100 further includes a separating board 70 detachably mounted in the chamber 10. One end of the separating board 70 is secured on the first sidewall 11, and located between the vacuum gate 15 and the first vacuum valve 51. The opposite end of the separating board 70 is secured on the second sidewall 13, and located between the second vacuum valve 61 and the bottom wall of the chamber 10. When the separating board 70 is installed in the chamber 10, the chamber 10 is divided into a lower separating chamber 12 and a upper separating chamber 14 by the separating board 70. The volume of the upper separating chamber 14 is greater than the volume of the lower separating chamber 12. The evaporator 20 is located in the lower separating chamber 12. The vacuum pump assembly 50 and the product collecting device 60 communicate with the opposite two sides of the upper separating chamber 14. When the separating board 70 is detached from the chamber 10, the lower separating chamber 12 and the upper separating chamber 14 become one chamber.

During the making of the nano-titanium dioxide, the crucible 21 is replenished with evaporative material as follows: first, the separating board 70 is mounted in the chamber 10; second, the vacuum gate 15 is opened to add titanium evaporation material in the crucible 21; third, the vacuum gate 15 is closed, and the separating board 70 is detached from the chamber 10. Then, the vacuum pump assembly 50 is turned on to evacuate the chamber 10.

During the crucible replenishing process, the lower separating chamber 12 communicates with the atmosphere, while the upper separating chamber 14 is isolated from atmosphere and experiences a vacuum, thus saving time for evacuating the chamber 10. The separating board 70 may be made of stainless steel. In the embodiment, the separating board 70 is made of 304# type stainless steel.

A method for making nano-scale particles of titanium dioxide using the device 100 is also provided, which includes at least the following steps:

Titanium evaporation material is provided and positioned in the crucible 21.

The second vacuum valve 61 is closed. The first vacuum valve 51 is opened and the separating board 70 is detached from the chamber 10. Then, the chamber 10 is evacuated by the vacuum pump 53 and the holding pump 55 until the internal pressure of the chamber 10 is reduced to about $1.0^{-2}$ Pa to about $1.0^{-3}$ Pa.

The heater 30 is turned on to heat the chamber 10 until the internal temperature of the chamber 10 is about 600° C. to about 800° C.

The heating element 23 is turned on to vaporize the evaporation material. Argon may be used as working gas and have a flow rate of about 300 Standard Cubic Centimeters per Minute (sccm) to about 500 sccm. Oxygen ($O_2$) may be used as reaction gas and have a flow rate of about 200 sccm to about 300 sccm. The internal pressure of the chamber 10 is about 1 Pa to about 10 Pa.

In the embodiment, the oxygen should have a flow rate of about 200 sccm to about 300 sccm. If the flow rate of the oxygen is lower than 200 sccm, a great quantity of vaporized titanium will be extracted by the mechanical pump 63 to the powder collector 67 through the guide pipe 65, but the purity of the nano-titanium dioxide will not be high. If the flow rate of the oxygen is higher than 300 sccm, a great quantity of oxygen in the chamber 10 will be extracted by the mechanical pump 63 from the chamber 10, merely increasing the consumption of oxygen.

When the titanium evaporation material has been melted, the second vacuum valve 61 is opened and the mechanical pump 63 is turned on. The melted titanium evaporation material is further vaporized in the heat, to react with the oxygen to form the vaporized titanium dioxide. The titanium dioxide vapor is extracted by the mechanical pump 63 to the powder collector 67 through the guide pipe 65. The powder collector 67 cools the vaporized titanium dioxide to form nano-titanium dioxide particles. The organic solvent 69 may be a diluted solution containing ethanol, isopropanol, or butanol. The mass concentration of the organic solvent is about 50% to about 70%.

The organic solvent is filtered from the nano-titanium dioxide particles. The nano-titanium dioxide particles are then cleaned by water to remove residual organic solvent adhering on the surface of the nano-titanium dioxide particles. After that, the nano-titanium dioxide particles are dried at a temperature of about 200° C. to about 300° C. The individual particle size of the nano-titanium dioxide is about 30 nm to about 100 nm. When taking into account unreacted $TiO_2$ and other reaction waste products, the proportion of nano-scale particles of titanium dioxide in the powder collected is about 80% to about 95%.

During the manufacturing process, the organic solvent 69 prevents the titanium dioxide particles from agglomerating. The heater 30 prevents vaporized titanium evaporation material and vaporized titanium dioxide from being deposited on the inner peripheral wall of the chamber 10. The separating board 70 retains the pressure level in the upper chamber 14 as fresh material for evaporation is added into the lower chamber 12, which has to be returned to room temperature as the fresh material is added. When the separating board 70 is removed, the entire chamber pressure is lowered, thereby saving time in completely re-evacuating the chamber 10. The board 17 prevents the vaporized nano-titanium dioxide from condensing and being deposited on the inner peripheral wall of the chamber 10.

It is to be understood, however, that even through numerous characteristics and advantages of the exemplary disclosure have been set forth in the foregoing description, together with details of the system and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A device for making nano-scale particles of titanium dioxide, comprising:
   a vacuum chamber;
   an evaporator being mounted in the vacuum chamber;
   a gas supplier communicating with the vacuum chamber;
   a vacuum pump assembly communicating with the vacuum chamber;
   a product collecting device communicating with the vacuum chamber, the product collecting device comprising a pump, a guide pipe connected with the pump, and a powder collector communicated with the guide pipe; the pump communicating with the vacuum chamber, the guide pipe being inserted in the powder collector to communicate with the powder collector, the powder collector being filled with organic solvent; and
   a separating board detachably mounted in the vacuum chamber, wherein when the separating board is installed on the vacuum chamber, the vacuum chamber is divided into a lower separating chamber and a upper separating chamber by the separating board.

2. The device of claim 1, wherein the organic solvent is a diluted solution containing ethanol, isopropanol, or butanol.

3. The device of claim 2, wherein the mass concentration of the organic solvent is about 50% to about 70%.

4. The device of claim 1, wherein the volume of the upper separating chamber is greater than the volume of the lower separating chamber.

5. The device of claim 1, wherein the vacuum chamber includes a first sidewall and an opposite second sidewall, the first sidewall defines a vacuum gate; when the separating board is mounted in the chamber, one end of the separating board is secured on the first sidewall, the opposite end of the separating board is secured on the second sidewall, the vacuum pump assembly communicates with the lower separating chamber, the product collecting device communicates with the lower separating chamber, the evaporator locates in the lower separating chamber, the first sidewall locates in the sidewall of the lower separating chamber.

6. The device of claim 1, wherein the separating board is made of stainless steel.

7. The device of claim 1, further including a heat insulating board covering on the inner peripheral wall of the vacuum chamber.

8. The device of claim 7, wherein the heat insulating board is made of ceramic, or asbestos material with high temperature resistance.

9. The device of claim 1, wherein the evaporator includes a crucible and a heating element located around the crucible.

10. The device of claim 9, wherein the heating element is a high frequency induction heating device.

11. The device of claim 9, wherein the powder collector includes an interlayer in which cooling water/solution flows.

12. The device of claim 1, wherein the device further includes a heater mounted in the chamber and is surrounded by the inner peripheral wall of the vacuum chamber.

* * * * *